Nov. 24, 1925.

O. G. HERM 1,562,963

AUTOMATIC PLANIMETER

Filed May 9, 1924     10 Sheets-Sheet 1

Inventor
Ole G. Herm
by Davis & Hager Attys.

Nov. 24, 1925.

O. G. HERM 1,562,963

AUTOMATIC PLANIMETER

Filed May 9, 1924

Nov. 24, 1925.  1,562,963
O. G. HERM
AUTOMATIC PLANIMETER
Filed May 9, 1924   10 Sheets-Sheet 4

Fig. 4.

Inventor
Ole G. Herm
by Craig & Hague Attys.

Nov. 24, 1925.
O. G. HERM
1,562,963
AUTOMATIC PLANIMETER
Filed May 9, 1924      10 Sheets-Sheet 5
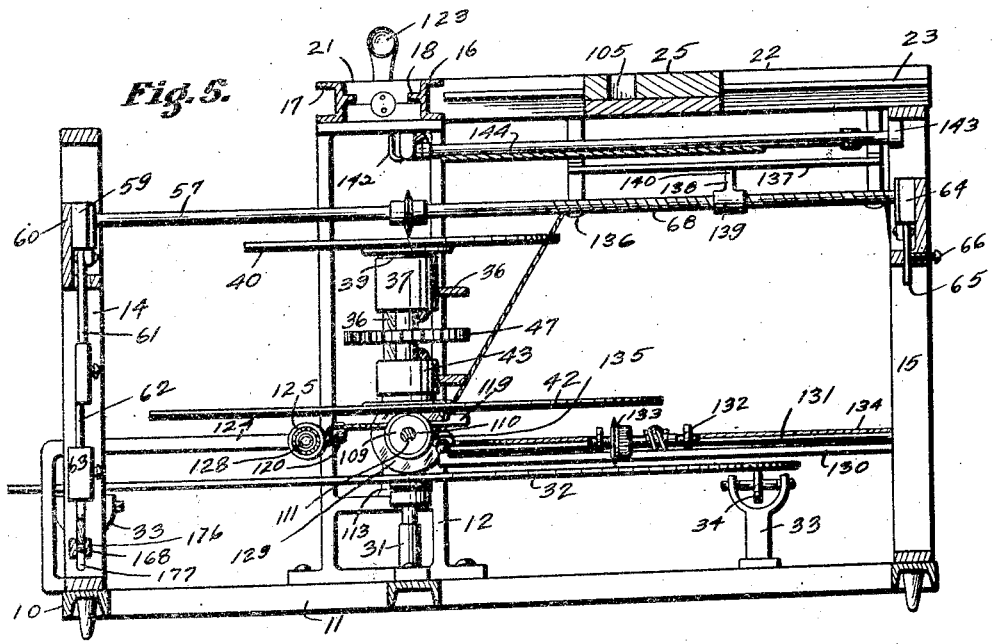
Fig.5.
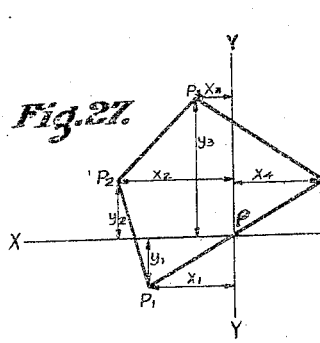
Fig.27.
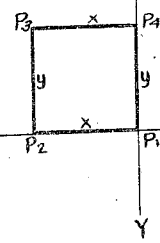
Fig.28.
Fig.31.
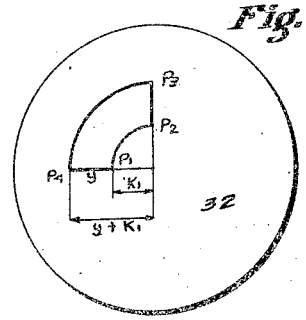
Fig.29.
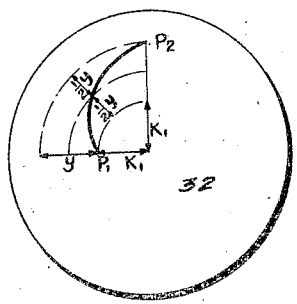
Fig.30
Inventor
O. G. Herm
by Owing & Hague Attys

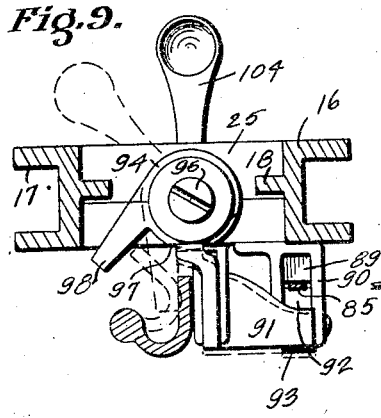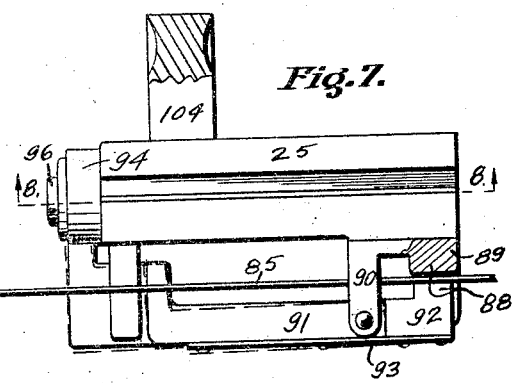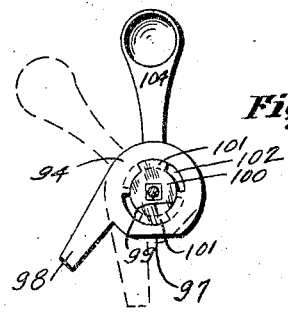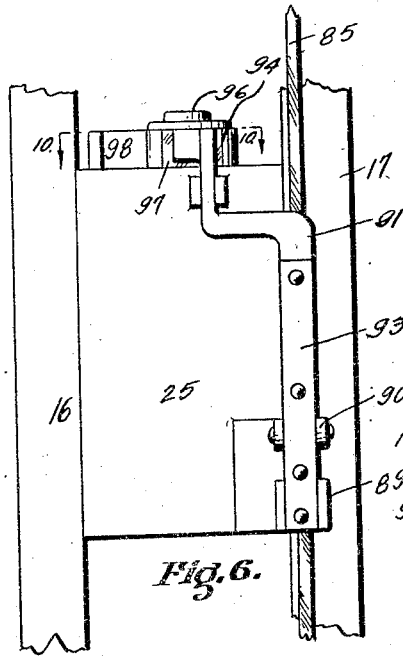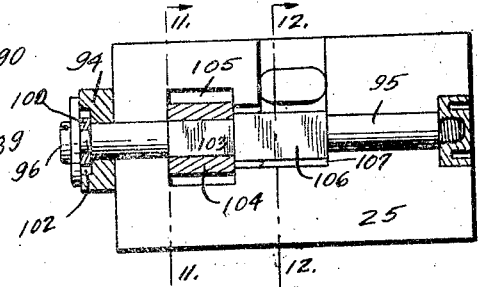

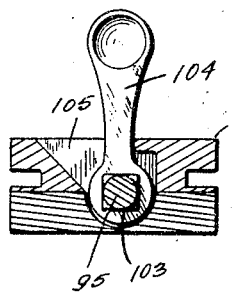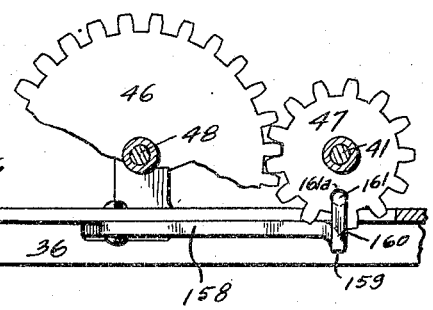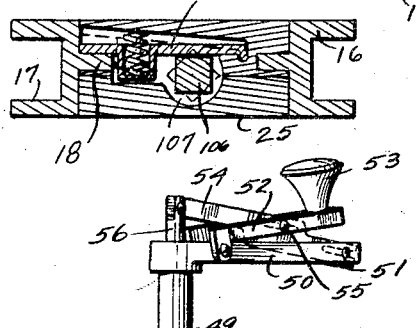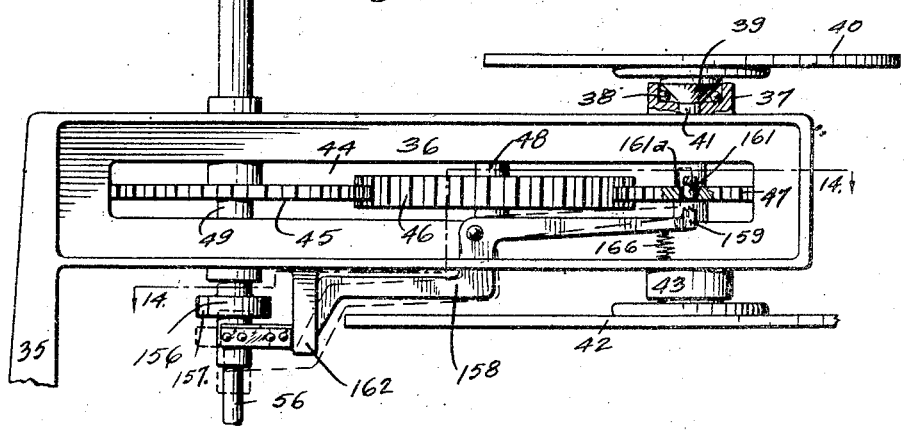

Nov. 24, 1925.
O. G. HERM
AUTOMATIC PLANIMETER
Filed May 9, 1924
1,562,963
10 Sheets-Sheet 8
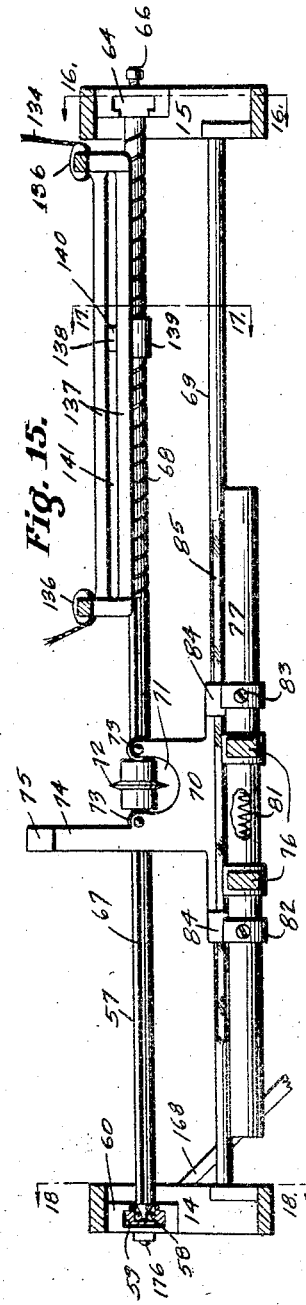
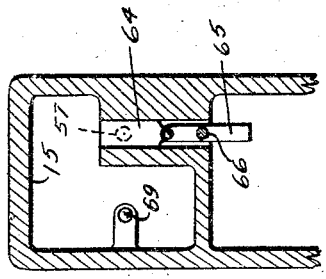
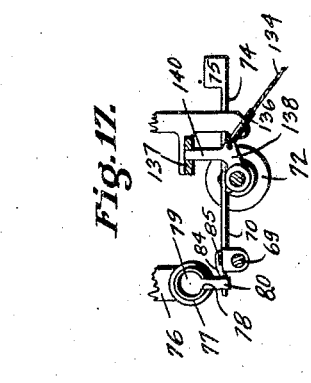
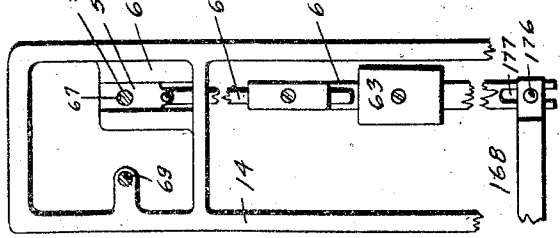

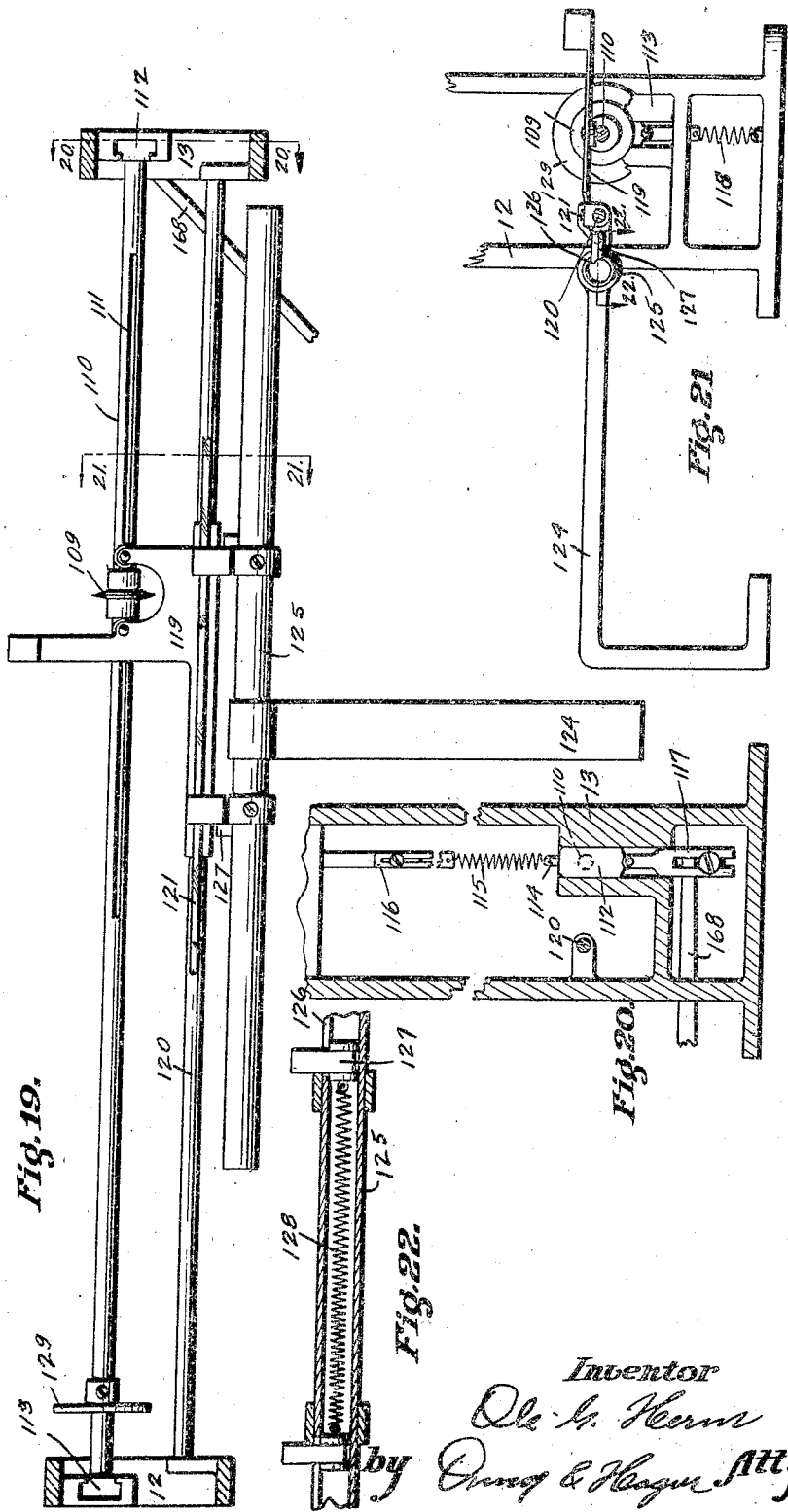

Nov. 24, 1925.  1,562,963
O. G. HERM
AUTOMATIC PLANIMETER
Filed May 9, 1924    10 Sheets-Sheet 10
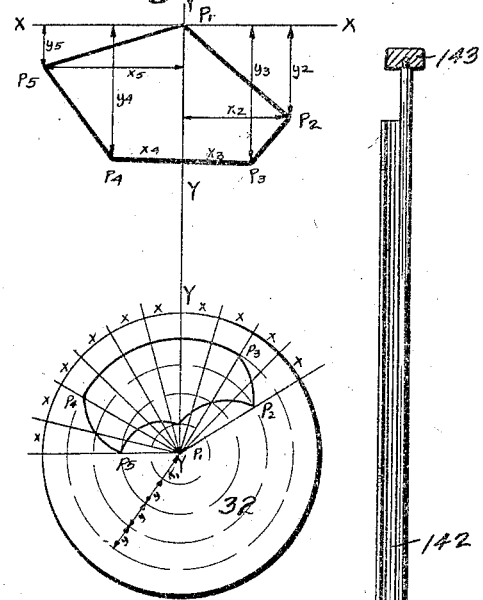
Fig. 33.
Fig. 32.
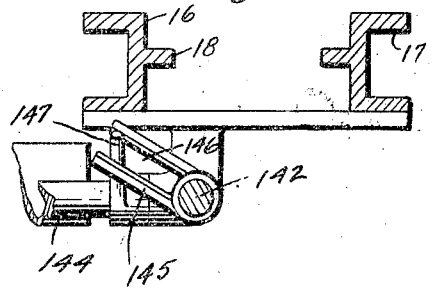
Fig. 24.
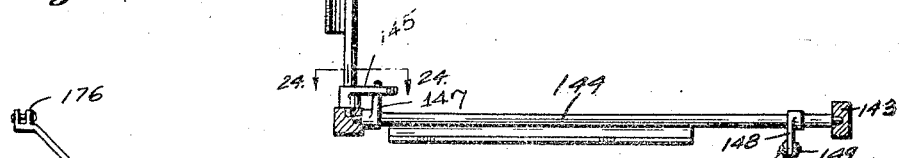
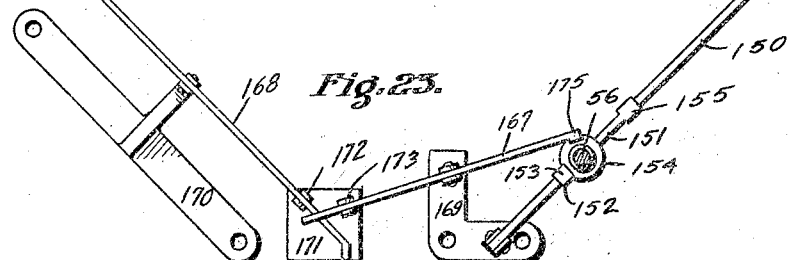
Fig. 23.
Inventor
Ole G. Herm
by Owing & Hague, Attys.

Patented Nov. 24, 1925.

1,562,963

UNITED STATES PATENT OFFICE.

OLE G. HERM, OF MARSHALLTOWN, IOWA.

AUTOMATIC PLANIMETER.

Application filed May 9, 1924. Serial No. 712,107.

*To all whom it may concern:*

Be it known that I, OLE G. HERM, a citizen of the United States, and a resident of Marshalltown, in the county of Marshall and State of Iowa, have invented a certain new and useful Automatic Planimeter, of which the following is a specification.

The object of my invention is to provide a planimeter of simple, durable and inexpensive construction which is accurate in its measurements and which is easy to operate, and particularly adapted to be used in connection with survey work.

A further object is to provide an improved planimeter for the purpose of measuring the area of regular and irregular polygons or cross sections without first having to plat the polygon and then trace the same by a planimeter such as is ordinarily used.

A further object is to construct a planimeter having two scales, one for taking care of the horizontal or abscissa measurements, and another scale to take care of the vertical or ordinate measurements, the scales being so arranged that the measurements taken may be placed directly on said scales and then by proper manipulation of auxiliary mechanism, the area of the polygon will be automatically carried by a suitable indicating mechanism.

My invention consists in the construction, arrangement and combination of the various parts of the device, whereby the objects contemplated are attained, as hereinafter more fully set forth, pointed out in my claims, and illustrated in the accompanying drawings, in which:

Figure 4 is a central longitudinal sectional view taken on the line 4—4 of Figure 1.

Figure 5 is a transverse sectional view taken on the line 5—5 of Figure 1.

Figure 6 is an inverted elevation of the bridge used in connection with the vertical reading scale, showing a certain locking mechanism.

Figure 7 is a side elevation of said bridge.

Figure 8 is a longitudinal sectional view taken on the line 8—8 of Figure 7.

Figure 9 is an end elevation of the bridge showing a portion of a track in which it is supported in section.

Figure 10 is a detail sectional view taken on the line 10—10 of Figure 6.

Figure 11 is a detail sectional view taken on the line 11—11 of Figure 8.

Figure 12 is a detail sectional view on the line 12—12 of Figure 8.

Figure 13 is a detail side elevation of the gearing mechanism designed to drive the integrator disk.

Figure 14 is a detail segmental view showing the locking mechanism for said drive gears.

Figure 15 is a detail plan view of the vertical integrator wheel showing the mechanism for carrying the same.

Figure 16 is a detail sectional view taken on the line 16—16 of Figure 15.

Figure 17 is a detail sectional view taken on the line 17—17 of Figure 15.

Figure 18 is a detail sectional view taken on the line 18—18 of Figure 15.

Figure 19 is a plan view of the horizontal integrator wheel showing the mechanism for mounting the same.

Figure 20 is a detail sectional view taken on the line 20—20 of Figure 19.

Figure 21 is a detail segmental view taken on the line 21—21 of Figure 19.

Figure 22 is a detail sectional view taken on the line 22—22 of Figure 21.

Figure 23 is a detail elevation of a portion of the control levers and release bars.

Figure 24 is an enlarged detail sectional view taken on the line 24—24 of Figure 23.

Figures 27, 28, 29, 30 and 31 are diagrammatical views to illustrate the theory of the operation of my device.

Figures 32 and 33 are also diagrammatical views illustrating the theory of the operation of my device.

Figure 1:
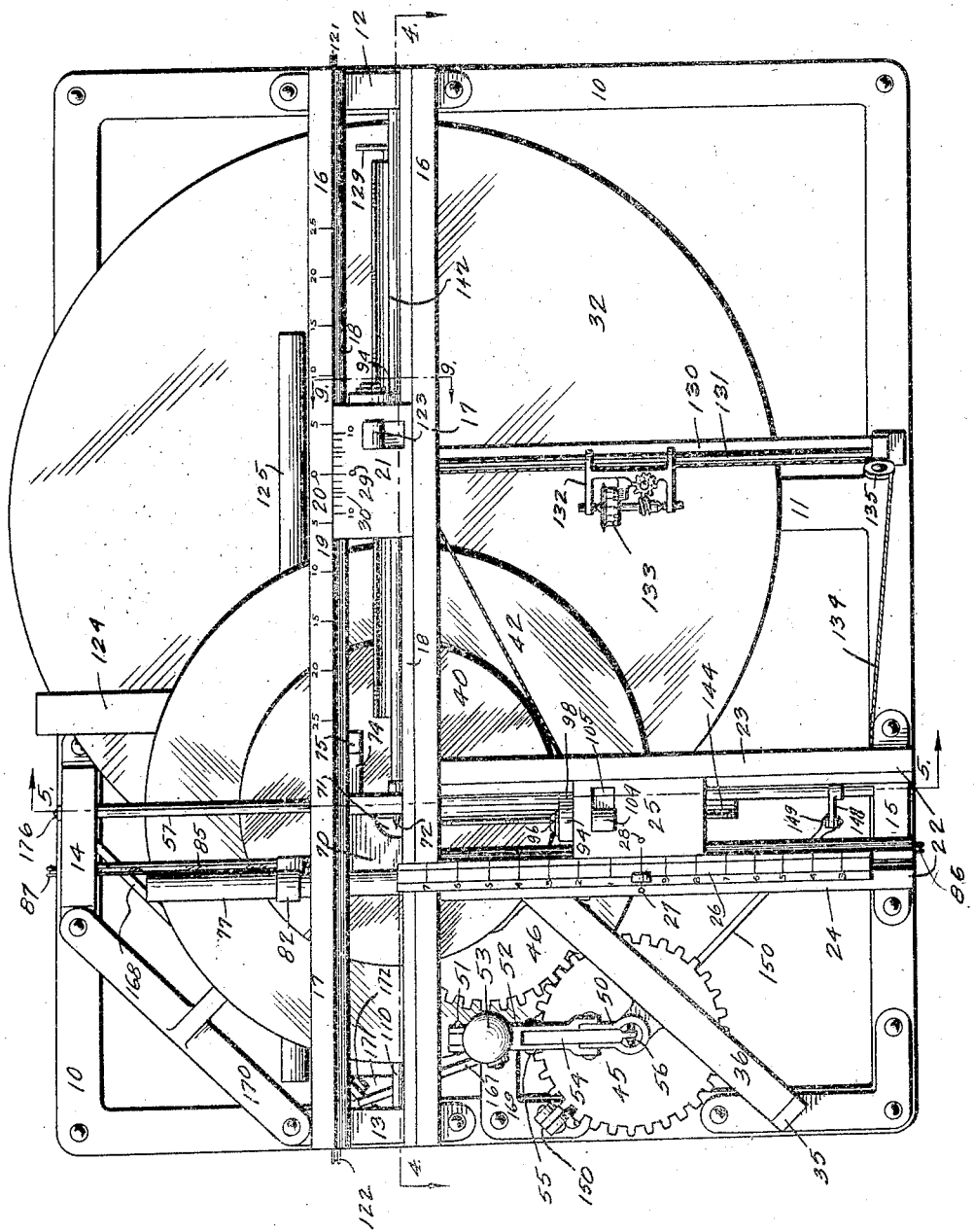
Figure 1 is a plan view of my planimeter.

The numeral 10 indicates the base of my improved device. This base is in the form of an open rectangular frame having a cross member 11. The member 10 is provided with upright members 12, 13, 14 and 15 rigidly secured to the base. The member 13 is supported on one of the end members of the base, while the upright member 12 is supported on the opposite end member of the base. The said uprights are opposite each other and have their upper ends connected by means of a track indicated generally by the numeral 16. The said track comprises a pair of channel members 17, each of which is provided with an inwardly extending tongue 18. The track 16 is clearly shown in section in Figure 9. One of the members 17 is provided with a graduated scale 19, said scale having a zero point 20 and provided with a series of graduations reading in both directions from said zero point. This scale is for the purpose of registering the horizontal readings.

Slidably mounted upon the members 18 I have provided what I shall term the horizontal bridge 21. Secured to the upper end of the upright 15 I have provided a track indicated generally by the numeral 22, which comprises two channel members 23 and 24 connected to one of the members 16 and arranged at right angles thereto. The members 23 and 24 are similar in cross section, and designed to carry what I shall term a vertical bridge 25. The member 24 is provided with a sliding scale 26 for the purpose of registering the vertical or rod readings, and is provided with a zero point 27 having graduations above and below. The scale above has its digits arranged to read in their natural consecutive order, while the scale below has its digits arranged to read in a reverse manner. The vertical bridge 25 is provided with the zero point 28, while the horizontal bridge 21 is provided with a zero point 29 and a short scale graduation 30. The bridges 25 and 21 and the mechanism carried thereby are otherwise identical, and for that reason but one of them will be described in detail.

Figure 2:
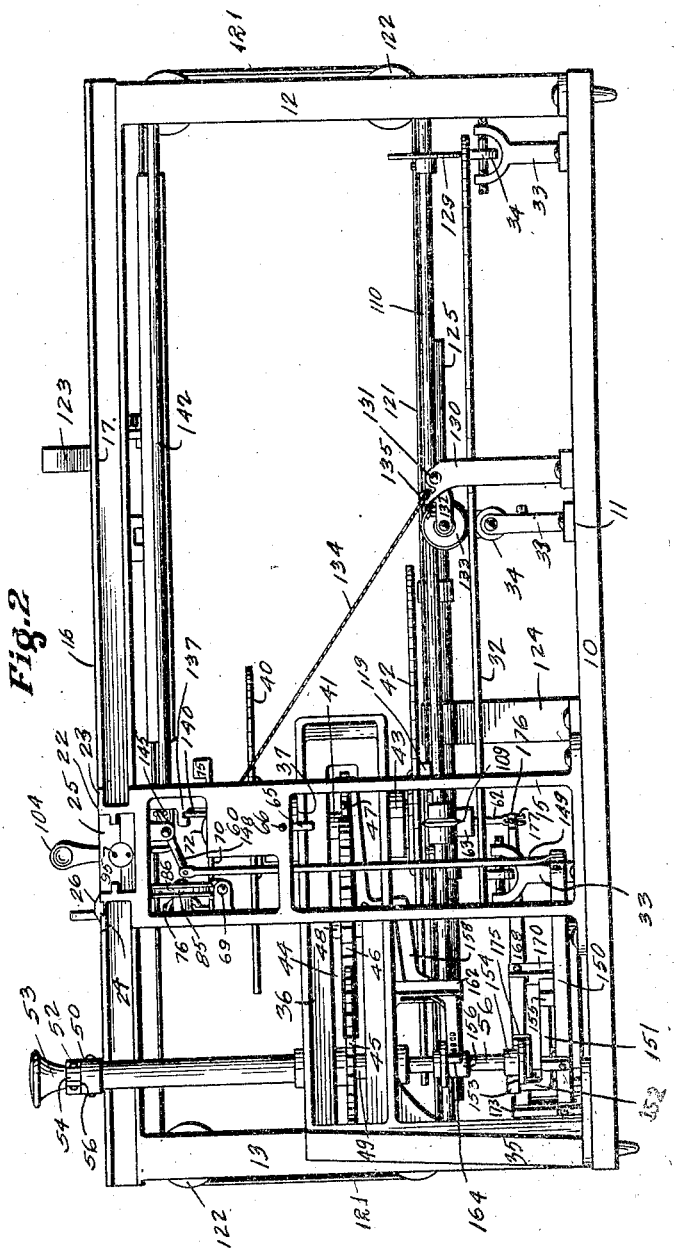
Figure 2 is a side elevation of the same.

Supported on the upper surface of the cross member 11 I have provided an upright support or post 31, the upper end of which is provided with a pivotally mounted and horizontally arranged disk 32, which I shall hereinafter term as the planimeter disk. The said planimeter disk has its outer edge supported by a series of uprights 33, each of which is provided with a roller bearing member 34 (see Figure 2).

Secured to one corner of the base 10 I have provided an upright 35 which has a horizontally extending portion 36, the inner end of which terminates at a point below the intersection of the track members 16 and 22. The inner end of said extension has on its upper surface a bearing member 37 designed to carry a set of ball bearings 38 (Figure 13) in which is mounted a cone 39. The said cone 39 carries a disk 40 in a horizontal plane. This disk I shall term the vertical integrator disk.

The cone 39 is mounted on the upper end of a vertical shaft 41, the lower end of which is designed to carry a horizontally arranged disk 42, which I shall term the horizontal integrator disk. The lower end of the shaft 41 is supported in a bearing 43. Both of the disks 40 and 42 are rigidly secured to said shaft and designed to rotate in unison, the centers of said disks lying in the center of said shaft. The said shaft 39 is located vertically below the point of intersection of the vertical and horizontal tracks.

The frame 36 is provided with a slot 44 in which is mounted gears 45 and 46 and a pinion 47. The pinion 47 is rigidly secured to the central portion of the shaft 41, while the gear 46 is mounted on a shaft 48 and in mesh with the pinion 47, and also in mesh with the gear 45. The said gear 45 is mounted on a tubular shaft 49 mounted vertically near the outer end of the member 36 and has at its upper end a crank arm 50, the outer end of which is bifurcated and provided with a pin 51.

Pivotally mounted at the inner end of the arm 50 is a second lever 52 which is also formed bifurcated, the free end of said lever being provided with a knob 53. A third lever 54 is slidably and pivotally mounted on the pin 51 and also slidably and pivotally mounted on a pin 55 in the lever 52. The free end of the lever 54 is pivoted to a rod 56 which extends downwardly through the tubular member 49.

By this arrangement it will be seen that I have provided means whereby the operator may grasp the knob 53 and impart upward or downward movement to the rod 56, and he may impart rotary movement to the tubular member 49 and the rod 56, and when such rotary movement is imparted, the gears 45, 46 and 47 will be rotated, which in turn will cause the disks 40 and 42 to be rotated, for the purpose hereinafter made clear.

Mounted in the uprights 14 and 15 I have provided a shaft 57 which rests horizontally above the integrator disk 40 and below the tracks 16 and 22 (see Figures 1, 3, 5 and 15). One end of the shaft 57 is formed conical and mounted in the roller bearings 58. The said roller bearings are mounted in a slide block 59 which is slidably mounted so as to move freely in a vertical path when in guideways 60 secured to the support 14.

The lower end of the block 59 is pivoted to the upper end of a link 61 extending downwardly to a point near the lower end of the support 14. The lower end of the link 61 is adjustably connected to the upper end of another link 62. The link 62 is provided with a weight 63. The said links and the block 59 provide means whereby one end of the shaft 57 may be moved upwardly or downwardly by mechanism hereinafter described. The opposite end of the shaft 57 is provided with a slide block 64 in the upright 15 similar to the block 59 with the exception that it is provided with a short link 65. A set screw 66 is provided for locking the block 64 in any of its elevated or lowered positions, making the block 64 permanent after the machine has once been set. One end of the shaft 57 is provided with a keyway 67, and the other end is provided with a screw threaded portion 68.

The supports 14 and 15 are connected with a rigid shaft 69 running parallel with the shaft 57 which serves as a track upon which a carriage 70 may travel. This carriage is provided with a notch 71 designed to receive the hub of a vertical integrator wheel 72. This wheel is slidably and non-rotatably mounted on the shaft 57. The member 70 is provided with anti-friction rollers 73 and an overhanging arm 74, the outer end of which is provided with a weight 75 which serves to hold the rollers 73 in position relative to the hub of the wheel 72.

Extending downwardly from the track members 17 are two extensions 76 designed to carry a tubular member 77 provided with a slot 78 in its lower surface. The tubular member 77 is designed to receive two plungers 79, each of which is provided with a downwardly extending pin 80 extending through the slot 78. The plungers 79 are connected together by means of a spring 81 so that they have a tendency to yieldably move toward each other, a similar construction being shown in Figure 22. The plungers 79 are limited against inward movement by means of collars 82 adjustably mounted on the tube 77 by means of set screws 83.

The back side of the carriage 70 is provided with a pair of rearwardly extending fingers 84 designed to engage the inner faces of the pins 80 so that if the carriage 70 is moved in one direction, one of the pins 80 will be moved outwardly against the action of the spring 81, or in other words, it will be seen that the spring 81 will have a tendency to center or return the carriage 70 to a predetermined position, which may be determined by setting the collars 82. The said position is with the integrator wheel 72 above the center of the integrator disk 40 and so designed that the edge of the wheel 72 will rest on the upper surface of the disk 40, in such a manner that the said wheel 72 may be moved radially over the face of said disk in either direction, and to rest normally on the exact center of the said disk. The movement of this carriage 70 is accomplished through the vertical bridge 25.

The carriage 70 is provided with an endless, flexible, steel tape 85 designed to extend over pulleys 86 and 87 in the uprights 14 and 15. The lower run of the tape is permanently connected to the carriage 70, while the upper run is designed to make engagement with the bridge 25 by means of a clamp device 88 which consists of a stationary block 89 secured to the lower face of the bridge 25 (Figures 6, 7 and 9).

The face of the member 25 is provided with a pair of downwardly extending arms 90 between which is pivoted a lever 91, one end of which is provided with a block 92 secured in position to said lever 91 by a flexible member 93. The block 92 serves to grip the tape against the under surface of the block 89 when the free end of the lever 91 is lowered. The member 93 serves to permit the upper surface of the block 92 to make a firm grip on the said tape.

The free end of the lever 91 is actuated by means of a cam 94 pivotally connected to one end of a shaft 95 in the bridge 25 by means of a set screw 96. The cam 94 is provided with a flat portion 97 and a downwardly and outwardly extending portion 98. The flat portion 97 is designed to rest against the free end of the lever 91 when the block 92 is in its released position.

It will be seen that if the cam 94 is rotated, the free end of the lever 91 will be moved downwardly and the block 92 moved upwardly to grip the tape 85. The cam 94 is also provided with a recess 99 designed to receive a cam 100 having lugs 101 designed to operate in the recess 102. The said cam 100 is rigidly secured to the shaft 95 and operatively connected therewith. The shaft 95 is provided with a square portion 103 (Figures 8 and 11) designed to receive a handle 104 which extends upwardly through a notch 105 in the member 25, the notch being designed to permit the handle to rotate through a limited arch.

Adjacent to the square portion 103 is a larger square portion 106 which operates in a notch 107. Said notch 107 is designed to receive a pivoted and spring actuated plate 108. One end of the plate 108 is designed to rest on the track member 18 so as to frictionally engage the same to permit the bridge 25 to slide freely thereon. The said parts are so arranged that when the flat portion of the member 106 is adjacent to the plate 108, it will rest on the said track member 18, but if the shaft 103 is rotated, the free end of the plate 108 will be elevated and caused to disengage the track member 18.

The operation of the mechanism for setting the vertical integrator wheel 72 in its proper position on the integrator disk 40 is as follows:

Assuming that the bridge 25 is in the position illustrated in Figure 1, where the zero point 28 is in alinement with the zero point 27, and that the integrator wheel 72 is located centrally on the top face of the disk 40, and assuming that the rod reading is 5, the handle 104 is grasped and rocked in an anti-clockwise direction, as illustrated in Figures 9 and 11, causing the shaft 95 to be rotated, which in turn will cause the square portion 106 to be rotated, and the plate 108 elevated. The cam plate 101 will also be rotated within the slot 102, after which the cam 94 will also be rotated causing the free end of the lever 91 to be lowered and the block 92 to be elevated, thereby gripping the tape 85 securely to the bridge. The bridge may then be moved until the zero point 28 is opposite the numeral 5 on the scale 26. The gripping of the tape 85 will cause the wheel 72 to be moved radially over the face of the disk 40 at a distance from the center corresponding with the distance traveled by the bridge 25. It will further be seen that the bridge 25 may be moved either inwardly or outwardly to form either positive or negative setting, as hereinafter described, by moving the wheel 72 to corresponding sides of the center of the disk 40.

In Figures 19, 20, 21 and 22 I have illustrated in detail a portion of the mechanism for supporting and controlling the horizontal integrator wheel 109. This wheel is designed to engage the under surface of the horizontal integrator disk 42 and to be rotated by the rotation of said disk. Both of said integrator wheels 72 and 109 are designed to be rotated by their respective disks. The wheel 109 is slidably and non-rotatively mounted on the shaft 110 and is provided with a key seat 111. The said shaft is supported in slide blocks 112 and 113. The slide block 112 is similar to the block 59 with the exception that it has an upwardly extending portion 114 to which is connected a spring 115. The upper end of the spring 115 is provided with an adjustable plate 116 by means of which the block 112 is yieldably held upwardly so that the wheel 109 will be yieldably held against the under surface of the disk 42. The block 112 is provided with a downwardly extending link 117. The block 113 is adjustably secured in the support 12 for supporting the other end of the shaft 110. This block 113 is movably mounted in position. A spring 118 is provided for yieldably moving the said block downwardly.

The wheel 109 is mounted in a carriage 119 similar to the carriage 70, and pivotally and slidably mounted on a shaft 120. Said carriage is provided with a flexible tape 121 designed to extend over pulleys 122 placed in the upright members 12 and 13, and designed to extend under the horizontal bridge 21 and provided with a locking mechanism similar to the locking mechanism of the bridge 25. The said bridge 21 is provided with a control lever 123.

Thus it will be seen that when the bridge 21 is moved, the carriage 119 may be moved through the flexible tape 121, and that the wheel 109 may be moved to either side of the center of the under surface of the disk 42. A support 124 is provided for securing the tubular member 125 in position, which is similar to the tubular member 77. The tubular member 125 is provided with slots 126 to receive the outwardly extending pins of plungers 127, the plungers being moved toward each other by means of a spring 128 similar to the spring 81 and for the same purpose.

One end of the shaft 110 is provided with a drive wheel 129 designed to engage the upper surface of the planimeter disc 32 near the periphery of said disc and provides means for imparting rotation thereto. The said wheel 109 is yieldably held in contact with the disk 32 by means of the spring 118 before described.

Rigidly secured on the frame 10 is a cross frame member 130 secured above the disk 32 and provided with a guide rod 131. The said guide rod is mounted parallel with a radial line from the center of said disk. The rod 131 is designed to receive a planimeter carriage 132 provided with a planimeter wheel 133 designed to actuate the ordinary planimeter mechanism. The wheel 133 is actuated by engaging the upper surface of the disk 32 while the said disk is being rotated. The rotation of the planimeter wheel may be varied with respect to the rotation of the plate 32 by moving it toward or from the center of said disk 32. The center of the planimeter wheel 133 is designed to travel in a radial line with the axis of the disk 32.

The planimeter frame 132 is actuated by means of a flexible cable 134 which extends over suitable pulleys 135 mounted at each end of the support 131, and another set of pulleys 136 mounted on a stationary frame 137 (see Figures 15 and 17). The end of the said cables are fixed to a carriage 138 which is provided with a screw threaded nut 139 to engage the threaded portion 68 of the rod 57. The carriage 138 is also provided with an upwardly extending member 140 designed to travel in a groove 141 in the frame 137.

By this arrangement it will be seen that as the wheel 72 is rotated, the shaft 67 will be rotated and the nut 139 will be moved longitudinally with the shaft and carry with it the carriage 138. This in turn will cause the cable 134 to travel over the pulleys 136 and 135, causing the frame 132 to be moved on the track 131.

Extending longitudinally beneath the track member 16 I have provided an angle bar 142 (see Figures 1, 3, 23 and 24). Each end of the bar 142 is pivoted to a downwardly extending frame member 143. A similar bar 144 is provided beneath the track members 22. The said bars are arranged at right angles, as clearly shown in Figure 23, and have their adjacent ends pivotally mounted in one of the bearing members 143. The two bars are operatively connected with each other by means of an arm 145 rigidly secured to the bar 142, said arm being provided with a slot 146 designed to receive the end of an arm 147 secured to the bar 144. This provides means whereby if the bar 144 is rocked, the bar 142 will simultaneously be rocked.

The bar 142 is mounted beneath the horizontal bridge 21, while the bar 144 is mounted beneath the vertical bridge 25 in such a manner that when the said bar is rotated to a certain position, as shown by dotted lines in Figure 9, it will engage the cam member 98 causing the said cam to be released and moved to its normal position of movement. This provides means for automatically releasing the tapes 85 and 121. The bar 144 is provided with an arm 148 to which a downwardly extending link 149 is pivoted (see Figures 3 and 23). The lower end of the link 149 is pivotally connected to a lever 150 which is provided with a pivoted pawl 151 having an upwardly extending portion 152, the upper end of which is provided with a catch 153 designed to engage a collar 154 on the lower end of the shaft 56, in such a manner that as the said shaft 56 is elevated, the collar 154 will be elevated, which in turn will elevate the link 149, and which in turn will rotate the members 142 and 144, and the tapes 85 and 121 released.

It will be seen that a continuation of the upward movement of the shaft 56 will cause the catch 153 to disengage the collar 154, due to its angular movement about the pivot of the lever 150. The face of the catch 153 is beveled to permit it to rehook when the shaft 56 is being lowered. The pawl 151 is provided with a weighted end 155 for the purpose of actuating the catch 153.

Figure 3:
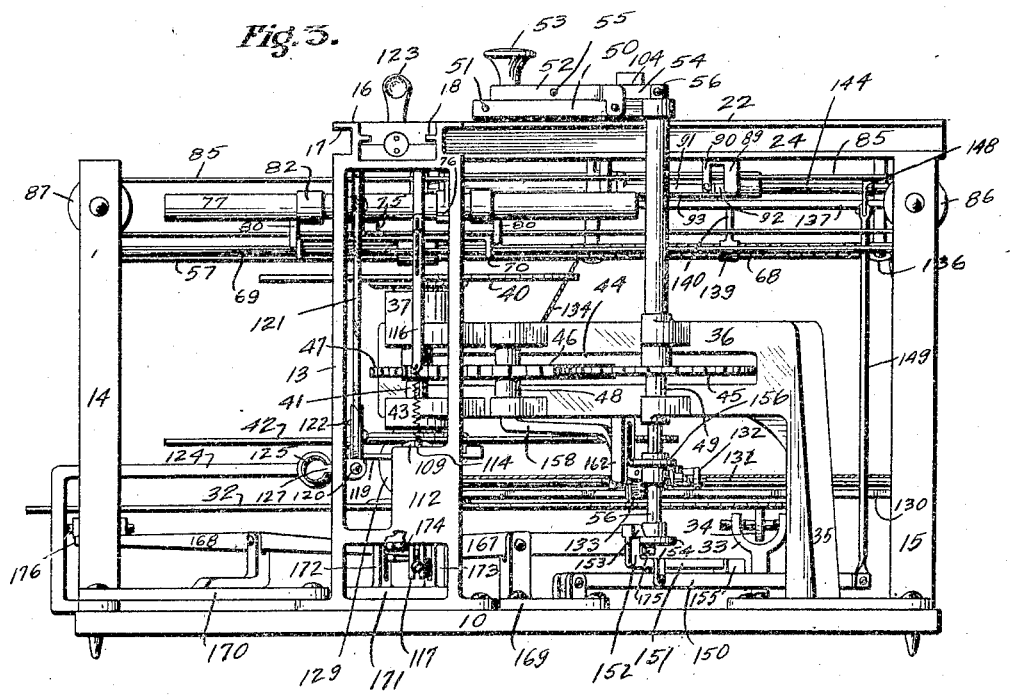
Figure 3 is an end view of the same.
Figure 25:
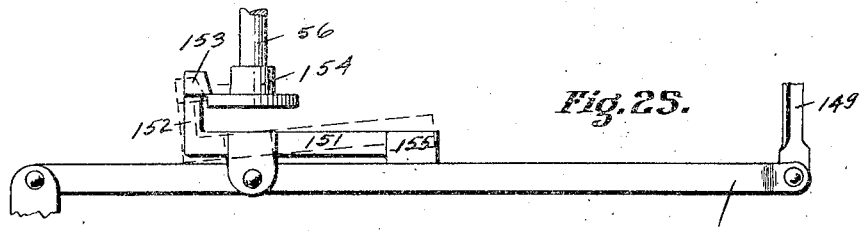
Figure 25 is an enlarged detail elevation of one of the control levers.
Figure 26:
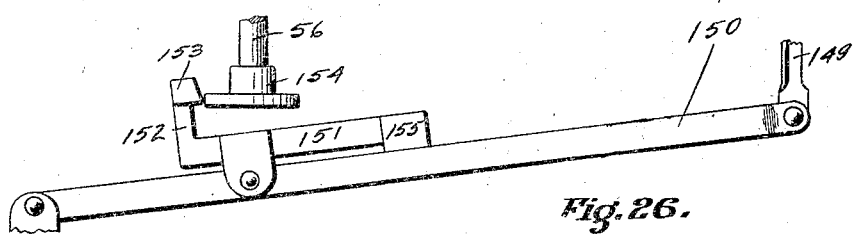
Figure 26 is an elevation of the same showing the lever in another position.

For automatically locking and unlocking the gear 47 against accidental rotation, I have provided a locking mechanism illustrated in Figures 3, 13 and 14, which comprises a collar 156 mounted on the shaft 56 above the collar 154. The collar 156 is provided with a notch 157.

Pivotally mounted to the frame member 36 I have provided a lever 158, one end of which is provided with an upwardly extending portion 159 provided with a horizontally extending portion 160, which terminates with a downwardly extending pin 161 designed to enter an opening 161ᵃ in the gear 47 as the member 159 is lowered, and to disengage the said opening when said member is elevated. The opposite end of the lever 158 is designed to move between guide members 162, the free end of which is provided with a spring 163 which is provided with a block 164 having a beveled face 165. The said block 164 is designed to rest normally beneath the collar 156.

It will be seen that as the shaft 56 is moved downwardly, the collar 156 will engage the upper surface of the block 164 and be moved downwardly, which at the same time will cause the member 159 to be elevated and the gear 47 unlocked, after which the crank 50 may be rotated, and with it the gears attached thereto. When the shaft has been rotated through an angle of about 270°, the notch 157 will move to position above the block 164. The block will then move upwardly into the notch 157 through the action of a spring 166, which has a tendency to lower the member 159 and elevate said block. This will permit the pin 161 to rest on the upper surface of the gear 47 until the said gear 47 has been rotated to a point where the opening 161ᵃ will enter beneath the pin 161, at which time the said pin will be drawn into said opening through the action of the spring 166, the block 164 being free to move upwardly due to the fact that it engages the outer face of the collar 156, as clearly shown in dotted lines in Figure 14. This provides means whereby the device will be automatically locked when the crank 53 has made one complete revolution.

For moving the integrator wheels 72 and 109 into and out of engagement with their respective disks so that they will slide freely on their respective shafts while being set, I have provided pivoted levers 167 and 168. The lever 167 is pivotally connected to a base member 169, while the lever 168 is pivoted to a base member 170. A base member 171 is provided which has a set of upwardly extending guide members 172 and 173, the guides being for the purpose of slidably supporting the said levers against lateral movement. The lever 167 is provided with a slot 174 designed to receive one end of the lever 168. The opposite end of the lever 167 is provided with two ears 175. The collar 154 is designed to operate between said ears 175, and as the collar is moved up and down with the shaft 56, the levers 168 and 167 will be actuated.

It will be seen that as the shaft 56 is moved to its elevated position, the inner end of the lever 168 will be lowered, which is connected to the link 117, thus providing means for moving the horizontal integrator wheel out of engagement with the under surface of the disk 42, while the opposite end of the lever 168 is connected to the lower end of the link 62 by means of a pin 176 designed to enter a slot 177 in the lower end of said link. Due to this lever being pivoted, the pin 176 will be elevated and with it the link 62, which in turn will elevate the bearing 59 and the adjacent end of the shaft 57, causing the integrator wheel 72 to be elevated.

Thus it will be seen that normally the integrator wheels 72 and 109 are held out of operative relation in their respective disks. The levers for controlling the shaft 56 are at this time in the position shown in Figure 13.

To simplify the description of the theory and the operation of this mechanism, I am giving a brief description of the consecutive operations of the various devices that will take place at each time a setting is placed in the machine:

Assuming that the bridges are placed at a zero position and that the other mechanisms are in their normal positions and that a vertical measurement has been made, which is placed in the machine by moving the vertical bridge either inwardly or outwardly, if the vertical measurement is above the base line, then the bridge is moved upwardly, or if the measurement is measured down from the base line, then the said bridge 25 will be moved downwardly, and this downward movement will hereinafter be considered as negative in the problems to follow.

The movement of the said bridge will cause the integrator wheel 72 to be moved longitudinally with the shaft 57 to a point at either side of the center of the disk 40. The knob 53 is then grasped and moved downwardly, which in turn will cause the shaft 56 to move downwardly through the lever devices 52 and 54. The downward movement of said shaft 56 will cause the movable end of the shaft 57 to be lowered and the integrator wheel 72 to be brought into engagement with the disk 40 through the block 59, the links 61 and 62 and the levers 167 and 168. The said wheel 72 is yieldably held in contact with the disk 40 by the weight 63. The downward movement of the shaft 56 will cause the lever 158 to be rocked and the gear 47 unlocked. The crank 50 may then be rotated through one revolution, at which time the pin 161 will again enter the opening 161ª.

The rotation of the crank 50 will cause the tubular shaft 49 to rotate and with it the gear 45, which in turn will rotate the intermediate gear 46 and from it the gear 47, which in turn will cause the disks 40 and 42 to be rotated. The rotation of the disk 40 in turn will cause the integrator wheel 72 to be rotated and with it the shaft 57. This movement causes the carriage 138 to move longitudinally of said shaft and the cable 134 to be moved, which will result in the planimeter wheel 133 being moved radially over the surface of the disk 32, the said planimeter wheel being mounted in the frame 132 which is pivotally mounted on the shaft 131 to frictionally engage the upper surface of the said disk 32. This radial movement, however, will impart no angular movement to the wheel 133.

At the time the knob 53 is released, the shaft 56 will be elevated, which in turn will cause the free end of the lever 150 to be elevated and with it the link 149, which in turn will operate the release bars 142 and 144. The release bar 144 will engage the lug 98 of the cam 94 causing the said cam to be moved to the position shown in solid lines in Figure 9. This will permit the clamp 92 to be released from the tape 85, permitting the integrator wheel 72 to move to a position centrally over the disk 40 through the action of the spring 81.

It will be seen from the above description that the device consists of a frame having two sets of tracks to accommodate a sliding scale, one of which may be utilized to set the horizontal measurements and the other to set the vertical measurements. This is accomplished by moving the respective bridges with their zero points opposite the desired setting.

The device further consists of three disks, two of which are mounted on a common axis and parallel with each other and driven simultaneously by suitable gearing mechanism, and a larger disk known as the planimeter disk which is driven through a mechanism operated from one of the above disks. The said disk is designed to rotate a planimeter wheel by the wheel being brought into frictional contact therewith. It will be seen that the amount of rotation imparted to said planimeter wheel depends on two factors, one is the distance that the planimeter wheel is from the center of the planimeter disk, and the other is the angle through which the said disk is rotated. The amount of rotation of said planimeter wheel may be varied by varying either of the two said factors. The distance in which the planimeter wheel operates from the center of the planimeter disk 32 is controlled through the cable 134 and the frame 137 and the rotation of the shaft 57 through the integrator wheel 72. The rotation of the integrator wheel 72 is controlled by the rotation of the disk 40, the said disk being rotated a definite number of turns for each setting, which in this particular instance is two revolutions to one revolution of the crank 50.

It will then be seen that the amount of movement of the planimeter wheel 133 will depend on one factor, inasmuch as the number of revolutions of the disk 40 is fixed.

That factor is the distance in which the integrator wheel 72 is operated from the center of the disk 40. This distance is controlled indirectly by the movement of the vertical bridge 25. The angular movement of the disk 32 is controlled by the rotation of the wheel 129 which is driven directly from the integrator shaft 110, which is in turn rotated by means of the integrator wheel 109 engaging the under surface of the disk 42 when moved to any position other than the exact center of said disk.

The amount of rotation of said integrator shaft 110 also depends on two factors, one is the angular movement of the disk 42, and the other is the distance the integrator wheel 109 rests from the center of said disk 42 while the said disk is being rotated. The number of revolutions of the disk 42 is also fixed to two revolutions by the gearing mechanism above described. It will be seen that the angular movement of the disk 32 is controlled by the radial movement of the integrator wheel 109 respective to the disk 42. By the mechanism above described, this movement will be accomplished through the bridge 21 which is designed to set the horizontal measurements.

It will, therefore, be seen that by first setting the vertical bridge to a point either above or below the zero point, then rotating the disk 40 through the gearing mechanism above described, which in turn will rotate the integrator wheel 72 and with it the shaft 57, which in turn will cause the cable 134 to be moved through its pulleys and the planimeter wheel 133 to be moved radially over the surface of the disk 32, this movement imparts no rotation to the said planimeter wheel, it being assumed that the bridge 21 is resting at the zero position while the above operation takes place. The horizontal bridge 21 may then be adjusted any desired amount to either side of the zero point and the crank 50 again rotated, which will cause the disk 42 to be rotated, and which in turn will cause the wheel 129 to be rotated by the integrator mechanism. Rotation will then be imparted to the planimeter wheel 133.

It will further be seen that if both of the bridges 21 and 25 are set to register both horizontal and vertical readings and the crank 50 is rotated while the bridges are thus set, a somewhat different movement will be imparted to the planimeter wheel. It will be seen that as the disk 32 is being rotated, the planimeter wheel will be moved either toward or from the center of the disk 32, causing the said planimeter wheel to travel through an angular path with respect to the movement of said disk 32. The purpose of this movement will hereinafter be explained.

In order that the operation of the device may be more clearly understood, the following problems will be solved. The following algebraic signs will be used in the following calculations:

$y$ equals the distance in inches set on the vertical scale.

$d^1$ equals the diameter of vertical integrator wheel (1 inch).

$x$ equals the distance in inches set on horizontal scale.

$d^2$ equals diameter of horizontal integrator wheel (1 inch).

$d^3$ equals diameter of drive wheel (1½ inches).

$d^4$ equals diameter of planimeter wheel (1 inch).

$n$ equals number of revolutions, (two) the integrator turns for each set.

$r$ equals the distance from the center of the drive wheel to the center of the planimeter disk.

$k$ equals the distance from the center of the planimeter wheel to the center of the planimeter disk when the instrument is open, or at the beginning of the problem.

$t$ equals the number of threads (four) to the inch, on the vertical integrator rod.

Inasmuch as the circumference of a circle varies directly as its radius or diameter, it is evident that the angular motion of the vertical and horizontal integrator wheels is in direct proportion of the amount of movement of either the vertical or horizontal bridges, either wheel being moved a distance from the center of its integrator disk equal to the movement of its respective bridge. This is true from the construction of the instrument. It is also true from the construction of the instrument that for any setting the integrator disk turns a constant number of revolutions, which in this particular device is two revolutions. If the vertical bridge is moved downwardly, the rotation of the corresponding integrator disk will be opposite to that which it would be if the vertical bridge were moved upwardly. Any downward movement will, therefore, be considered negative and any upward movement will be considered positive. If the horizontal bridge is moved to the left, the result on the planimeter disk is to rotate the same in the opposite direction from that which it would by moving the bridge to the right. Any movement of the horizontal bridge to the left will, therefore, be considered negative, and any movement to the right will be considered positive.

The above propositions are evident and do not require proof.

Referring to Figure 27 in which is illustrated a polygon $p\ p^1\ p^2\ p^3\ p^4$, in which is a base line $xx$ and a vertical line $yy$, and in which $y^1$, $y^2$, $y^3$ and $y^4$ are the ordinates and $x^1$, $x^2$, $x^3$ and $x^4$ are the abscissæ, commencing at the point $p$ and going around in a clockwise direction, I first set the vertical scale a distance from the base plate equal to $y^1$; this being done, the effect will be negative. The crank 50 is then rotated and the angular motion, measured in the number of revolutions of the vertical integrator wheel, is equal to $$-\frac{2y^1\pi n}{d^1\pi}.$$

The angular motion of the vertical integrator wheel for all points in going around the polygon will be respectively:

$$-\frac{2y^1\pi n}{d^1\pi}+\frac{2(y^1+y^2)\pi n}{d^1\pi''}+\frac{2(y^3-y^2)\pi n}{d^1\pi}-\frac{2(y^3-y^4)\pi n}{d^1\pi}$$

$$-\frac{2y^4\pi n}{d^1\pi}=\frac{2n}{d^1}(-y^1+y^1+y^2+y^3-y^2-y^3+y^4-y^4)=0$$

In a similar way it may be shown that the sum of the angular motion of the horizontal integrator wheel is equal to zero in measuring the same area.

It will, therefore, be seen that the planimeter is at the same distance from the center of the planimeter disk at the end of the run as it was at the beginning of the operation. It will also be seen that the planimeter disk is at the same location with respect to its angular motion about its axis at the end as it was at the beginning in measuring an area. These propositions are theoretically true in measuring around any area where the perimeter intersects in such a manner as to close the polygon.

To more clearly illustrate the theory of the device, I will measure the area of a square, such as is illustrated in Figure 28.

Assuming that the instrument has been cleared and everything in its normal position, and that the planimeter wheel reads zero and is stationed at a distance $k$ from the center of the planimeter disk and both vertical and horizontal integrator wheels are at the center of their respective disks, I first set the horizontal bridge to the left a distance $p^1 p^2$ equal to $x$. The vertical bridge is not moved at this time. I then turn the crank a complete revolution as above described. This will result in moving the disk 32 through a certain angular path, let us say, from the point $p^1$ to $p^2$ of Figure 29. The circumference of the planimeter disk will then be moved a distance equal to $$\frac{2x\pi nd^3}{d^2}.$$

The path $p^1 p^2$ inscribed by the planimeter wheel will then be equal to $$\frac{2x\pi nd^3}{d^2}\times\frac{k^1}{r}.$$

The number of revolutions of the planimeter wheel will be:

$$\frac{2x\pi nd^3}{d^2}\times\frac{k^1}{r}\times\frac{1}{d^1\pi}$$

This equation is true for this operation since the vertical integrator wheel remains at the center of the vertical integrator disk, and consequently does not turn.

For setting the vertical measurement $p^2 p^3$, I move the vertical bridge up a distance $y$ equal to the distance between the said points and again turn the drive crank one revolution, leaving the horizontal bridge in its zero position. The planimeter wheel will then be moved outwardly on the disk between the points $p^2$ and $p^3$, the said distance being equal to $$\frac{2y\pi n}{d^1\pi t}$$

inches, due to the fact that the horizontal integrator wheel is at the center of its disc and no rotation will be imparted to the planimeter disk. The distance between the points $p^3$ and $p^4$ are set on the horizontal bridge, which is moved to the right. The drive crank is again turned a complete revolution and the vertical bridge remaining stationary at its zero position. This operation will then move the circumference of the planimeter disk a distance of $$\frac{2x\pi nd^3}{d^2}$$

The number of revolutions of the planimeter wheel will be $$\frac{2x\pi nd^3}{d^2}\times\frac{k^1+y}{r}\times\frac{1}{d^1\pi}$$

To close the polygon, set the vertical bridge down a distance $$p^4 p^1 = y.$$

This moves the planimeter parallel to its axis a distance equal to $$-\frac{2y\pi n}{d^1\pi t}$$

inches.

The equation for angular motion of the planimeter in moving around the polygon will then be $$\left(\frac{2x\pi n d^3}{d^2}\times\frac{k^1+y}{r}\times\frac{1}{d^4\pi}\right)-\left(\frac{2x\pi n d^3}{d^2}\times\frac{k^1}{r}\cdot\frac{1}{d^4\pi}\right)$$

$$=\frac{2nd^3}{d^2rd^4}(xy)$$

It will be noted that the above equation consists of all constants except $x$ and $y$, or the horizontal and vertical components. They are both in the numerator and of the first power, therefore, we have a right to say that the angular motion of the planimeter wheel varies directly as the product of the horizontal and vertical components in this particular problem.

Referring to Figure 31 to find the angular motion of the planimeter wheel when moving from $p^1$ to $p^2$, this is accomplished by setting the horizontal bridge equal to a distance of $x$ and the vertical bridge a distance equal to $y$, both bridges being set before the crank 50 is operated. The crank 50 is then operated, which will cause the planimeter wheel to travel through a path $p^1\ p^2$ on the planimeter disk. This is accomplished by the planimeter wheel moving outwardly radially simultaneously with the rotation of the planimeter disk.

It is evident that the angular motion of the planimeter wheel varies per unit of angular motion of the planimeter disk when both horizontal and vertical integrator wheels are moved for the same operation, and it is also evident that the accelerated motion is uniform, and the average rate is equal to one-half the sum of the rate at the beginning and end of the operation. Therefore, in the second problem for angular motion of the planimeter wheel, I have (see $p^1\ p^2$ in Figure 30 for course of planimeter wheel).

$2x\pi n = \begin{cases} \text{Distance covered by the circumference of the horizontal integrator wheel.} \end{cases}$ $\dfrac{d^3}{d^2} = \begin{cases} \text{Ratio of the diameter of the drive wheel to the diameter of the horizontal integrator wheel.} \end{cases}$ $\therefore 2x\pi n\cdot\dfrac{d^3}{d^2} = \begin{cases} \text{Distance the circumference of the planimeter disc is moved.} \end{cases}$ $2y\pi n = \begin{cases} \text{Distance covered by the circumference of the vertical integrator wheel.} \end{cases}$ $\dfrac{2y\pi n}{d^1\pi} = \begin{cases} \text{The number of revolutions of the vertical integrator wheel.} \end{cases}$ $\therefore \dfrac{2y\pi n}{d^1\pi t} = \begin{cases} \text{Lateral motion of the planimeter in inches along the diameter of the planimeter disk.} \end{cases}$ It is then evident that $$-k-\frac{\frac{1}{2}(2y\pi n)}{d^1\pi t}$$

represents the average distance from the center of the planimeter disk to the center of the planimeter wheel. It is also evident that the ratio of the above distance, to the distance from the center of the planimeter disk to the center of the planimeter drive wheel, is equal to $$-\frac{k}{r}-\frac{\frac{1}{2}(2y\pi n)}{d^1\pi t r}$$

The distance covered by the circumference of the planimeter wheel, (perpendicular to the diameter of the planimeter disk), will then be $$2x\pi n\cdot\frac{d^3}{d^2}\cdot\left(-\frac{k^1}{r}-\frac{\frac{1}{2}(2y\pi n)}{d^1\pi t r}\right)$$

and the number of revolutions of the planimeter wheel will be $$2x\pi n\cdot\frac{d^3}{d^2}\cdot\left(-\frac{k^1}{r}-\frac{\frac{1}{2}(2y\pi n)}{d^1\pi t r}\right)\cdot\frac{1}{d^4\pi}$$

I will next find the area of the polygon illustrated in Figure 33, in which $xx$ is the base line and $yy$ is the vertical ordinate, and find the angular motion of the planimeter wheel in passing around the area $p^1\ p^2\ p^3\ p^4$ and $p^5$.

It will be seen from the second problem that the result contains a large number of constants and to simplify the solution of this problem I will let $$c=\frac{2nd^3}{d^2d^4r}$$

and $$c^1=\frac{2n'}{d^1t}$$

For angular motion I then have:

$$cx^2(-k^1-\tfrac{1}{2}y^2c^1)+c(-(x^2-x^3)[-k^1-y^2c^1-\tfrac{1}{2}(y^3-y^2)c^1])+c[-(x^3+x^4)(-k^1-y^3c^1)]+c(-(x^5-x^4)[-k^1-y^3c^1+\tfrac{1}{2}(y^4-y^5)])+cx^5(-k^1-y^5c^1+\tfrac{1}{2}y^5c^1)$$

By simplifying and substituting for the values of $c$ and $c^1$, the above equation becomes $$=\frac{4n^2d^3}{d^1d^2d^4rt}\cdot[-\tfrac{1}{2}x^2y^2+\tfrac{1}{2}(x^2-x^3)(y^2+y^3)+(x^3+x^4)y^3+(x^5-x^4)\tfrac{1}{2}(y^3+y^5)-\tfrac{1}{2}X^5Y^5]$$

I then find that the result is equal to the product of the constant $$\left(\frac{4n^2d^3}{d'd^2d'''r}\right)$$

times the sum of the products of the average horizontal and vertical components.

It is evident that in the above constant, for any instrument the values of the factors are all fixed except $r$.

The graduations of the horizontal and vertical scales may be determined as follows: Select $r=7\frac{1}{2}$ inches. The above constant is then equal to four-fifths.

It is desired to so choose the graduations on these scales that one revolution of the planimeter wheel is equal to ten square feet.

The equation in the third problem in its simplest form would be $\frac{4}{5}xy=$ number of revolutions of planimeter wheel. Assume $x$ equals ten feet and $y$ equal to one foot, then the number of revolutions of the planimeter wheel would be one.

Let ten feet on the horizontal scale equal two inches. Substitute in $\frac{4}{5}xy$ equals 1, the value of $x$ and solve for $y$. I then find $y$ equals $\frac{5}{8}$ inch or graduations on vertical scale: $\frac{5}{8}$ inch equals 1 foot.

It is evident from the above that if there is any variation, from the specifications, in the diameter of the above wheels, due to construction or wear, the error may be compensated by changing the value of $r$.

It will, therefore, be seen that I have provided a planimeter of comparatively simple, durable and inexpensive construction, so arranged that the operator, such as a surveyor, may take the horizontal and vertical measurements and log them in a suitable book, and afterwards place these measurements on the corresponding scale of the planimeter and rapidly determine the area of the various cross sections or polygons without having to first plat the cross section or polygon.

I claim as my invention:

1. A planimeter comprising a frame, a scale for registering vertical measurements, a movable bridge for said scale, a scale for registering horizontal measurements, a movable bridge for the last said scale, a planimeter disk, a planimeter wheel designed to frictionally engage one surface of said planimeter disk and having its axis mounted in a plane parallel to said disk and radially with the axis thereof, means operated from the movable bridge of said vertical scale for moving said planimeter wheel axially, and means operated from the bridge of said horizontal scale for rotating said planimeter disk.

2. A planimeter comprising a frame, a scale for registering vertical measurements, a movable bridge for said scale, a scale for registering horizontal measurements, a movable bridge for the last said scale, a planimeter disk, a planimeter wheel designed to frictionally engage one surface of said planimeter disk and having its axis mounted in a plane parallel to said disk and radially with the axis thereof, a pair of integrator disks, an integrator wheel for each of said disks, each of said integrator wheels having its axis mounted parallel and diametrically with its respective disk so that the wheel will engage the surface thereof, means for operatively connecting one of said integrator wheels with the bridge of said vertical scale so that as the said bridge is operated the integrator wheel will be moved axially across the surface of said disk, means operatively connected with the movable bridge of said horizontal scale for moving the other one of said integrator wheels axially respective to its disk, means for simultaneously rotating both of said disks, means actuated from the first one of said integrator wheels for moving said planimeter wheel axially, and means actuated from the second one of said integrator wheels for rotating said planimeter disk.

3. A planimeter comprising a frame, a scale for registering vertical measurements, a movable bridge for said scale, a scale for registering horizontal measurements, a movable bridge for the last said scale, a planimeter disk, a planimeter wheel designed to frictionally engage one surface of said planimeter disk and having its axis mounted in a plane parallel to said disk and radially with the axis thereof, a pair of integrator disks, an integrator wheel for each of said disks, each of said integrator wheels having its axis mounted parallel and diametrically with its respective disk so that the wheel will engage the surface thereof, means for operatively connecting one of said integrator wheels with the bridge of said vertical scale so that as the said bridge is operated the integrator wheel will be moved axially across the surface of said disk, means operatively connected with the movable bridge of said horizontal scale for moving the other one of said integrator wheels axially respective to its disk, means for simultaneously rotating both of said disks, means actuated from the first one of said integrator wheels for moving said planimeter wheel axially, means actuated from the second one of said integrator wheels for rotating said planimeter disk, and means for locking the driving means for said integrator disks when in their normal positions of movement.

4. A planimeter comprising a frame, a scale for registering vertical measurements, a movable bridge for said scale, a scale for registering horizontal measurements, a movable bridge for the last said scale, a planimeter disk, a planimeter wheel designed to frictionally engage one surface of said planimeter disk and having its axis mounted in a plane parallel to said disk and radially with the axis thereof, a pair of integrator disks, an integrator wheel for each of said disks, each of said integrator wheels having its axis mounted parallel and diametrically with its respective disk so that the wheel will engage the surface thereof, means for operatively connecting one of said integrator wheels with the bridge of said vertical scale so that as the said bridge is operated the integrator wheel will be moved axially across the surface of said disk, means operatively connected with the movable bridge of said horizontal scale for moving the other one of said integrator wheels axially respective to its disk, means for simultaneously rotating both of said disks, means actuated from the first one of said integrator wheels for moving said planimeter wheel axially, means actuated from the second one of said integrator wheels for rotating said planimeter disk, means for locking the driving means for said integrator disks when in their normal positions of movement, means for holding said integrator wheels out of engagement with said disks, while the bridges are being operated, and means for moving said integrator wheels into yieldable contact with their respective disks at the time the disks are being rotated.

5. A planimeter comprising a frame, a scale for registering vertical measurements, a movable bridge for said scale, a scale for registering horizontal measurements, a movable bridge for the last said scale, a planimeter disk, a planimeter wheel designed to frictionally engage one surface of said planimeter disk and having its axis mounted in a plane parallel to said disk and radially with the axis thereof, a vertical integrator disk, a horizontal integrator disk, an integrator wheel for each of said disks, each of said wheels being slidably and non-rotatively mounted on a shaft extending diametrically across the face of its respective disk, the vertical integrator shaft being screw threaded at one end, a carriage operatively connected with said screw threaded portion, a cable connecting said carriage with the said planimeter wheel, a flexible tape for moving said vertical integrator wheel longitudinally of its shaft, a clamp device for clamping said tape to the bridge of said vertical scale, a flexible tape for moving the integrator wheel of the horizontal integrator disk longitudinally of its shaft, a clamp device for operatively connecting said tape with the horizontal bridge, a friction wheel rigidly secured to the shaft in which the horizontal integrator wheel operates for rotating said planimeter disk, and means for rotating said vertical and horizontal integrator disks.

6. A planimeter comprising a frame, a scale for registering vertical measurements, a movable bridge for said scale, a scale for registering horizontal measurements, a movable bridge for the last said scale, a planimeter disk, a planimeter wheel designed to frictionally engage one surface of said planimeter disk and having its axis mounted in a plane parallel to said disk and radially with the axis thereof, a vertical integrator disk, a horizontal integrator disk, an integrator wheel for each of said disks, each of said wheels being slidably and non-rotatively mounted on a shaft extending diametrically across the face of its respective disk, the vertical integrator shaft being screw threaded at one end, a carriage operatively connected with said screw threaded portion, a cable connecting said carriage with the said planimeter wheel, a flexible tape for moving said vertical integrator wheel longitudinally of its shaft, a clamp device for clamping said tape to the bridge of said vertical scale, means for automatically moving the said integrator wheel to the center of its disk when the tape has been released by said clamp, a flexible tape for moving the integrator wheel of the horizontal integrator disk longitudinally of its shaft, a clamp device for operatively connecting said tape with the horizontal bridge, means for automatically moving the said integrator wheel to the center of its disk when the tape has been released by said clamp, a friction wheel rigidly secured to the shaft in which the horizontal integrator wheel operates for rotating said planimeter disk, and means for rotating said vertical and horizontal integrator disks.

7. A planimeter comprising a frame, a scale for vertical readings, a scale for horizontal readings, a movable bridge for each of said scales adapted to move in either direction from a given point, a planimeter wheel adapted to indicate the area of a polygon by being rotated, a disk for rotating said planimeter wheel by frictional engagement therewith, means actuated by said vertical bridge for moving said planimeter wheel radially with the face of said disk in either direction, and means actuated by the bridge of the horizontal scale for rotating the disk about its axis when the bridge is moved in one direction and for rotating the said disk in the opposite direction when the said horizontal bridge is moved in a reverse direction, substantially as described and for the purposes stated.

8. A planimeter comprising a frame, a vertical and horizontal scale on said frame, a movable bridge for each of said scales, a planimeter device for indicating the area of polygons, means actuated through the movement of said bridges for actuating said planimeter, said actuating means being so constructed and arranged that when the vertical and horizontal measurements are placed on the corresponding scales and said means actuated, the result, as read by the planimeter, will be equal to the area of the polygon covered by said measurements.

9. A planimeter comprising a frame, scales on said frame for indicating measurements of the rectangular co-ordinates of different points fixing the outline of polygons, a movable member for each of said scales for indicating on its scale the measurement of a given co-ordinate, a planimeter device for indicating the area of polygons, means actuated through the movement of said movable members for operating said planimeter, said operating means being so constructed and arranged that when the co-ordinates of the different points fixing the outline of a polygon have been successively indicated by said movable members upon said scales the planimeter will be actuated to indicate the area of the polygon whose points are fixed by said co-ordinates.

10. A planimeter comprising a frame, a scale for registering vertical measurements, a movable bridge for said scale, a scale for registering horizontal measurements, a movable bridge for the last said scale, a planimeter disk, a planimeter wheel designed to frictionally engage one surface of said planimeter disk and having its axis mounted in a plane parallel to said disk and radially with the axis thereof, a vertical integrator disk, a horizontal integrator disk, an integrator wheel for each of said disks, each of said wheels being slidably and non-rotatively mounted on a shaft extending diametrically across the face of its respective disk, one of the above shafts being screw threaded at one end, a carriage operatively connected with said screw threaded portion, means connecting said carriage with said planimeter wheel for moving said planimeter wheel axially when said carriage moves parallel to its shaft by the shaft being rotated by its integrator wheel, a friction wheel rigidly secured to the other one of said shafts for rotating said planimeter disk when the shaft to which said friction wheel is secured is rotated by its integrator wheel, means for moving each of said integrator wheels parallel to its shaft, a clamp device for operatively connecting the same to its bridge after being moved, means for automatically moving each of the said integrator wheels to the center of its disk when released by said clamps, and means for rotating said vertical and horizontal integrator disks.

Des Moines, Iowa, February 29, 1924.

OLE G. HERM.